(12) United States Patent
Sherman et al.

(10) Patent No.: US 8,632,677 B2
(45) Date of Patent: Jan. 21, 2014

(54) AQUARIUM BOTTOM CLEANER SYSTEM

(76) Inventors: Wayne Sherman, Bergen, NY (US);
Kathy Reulbach, Honeoye Falls, NY (US)

( * ) Notice: Subject to any disclaimer, the term of this patent is extended or adjusted under 35 U.S.C. 154(b) by 435 days.

(21) Appl. No.: 13/007,701

(22) Filed: Jan. 17, 2011

(65) Prior Publication Data

US 2012/0181222 A1  Jul. 19, 2012

(51) Int. Cl.
*B08B 9/08* (2006.01)
(52) U.S. Cl.
USPC ............ 210/167.23; 210/242.1; 15/1.7
(58) Field of Classification Search
USPC ......... 210/143, 167.21, 167.23, 242.1; 15/1.7
See application file for complete search history.

(56) References Cited

U.S. PATENT DOCUMENTS

| | | | |
|---|---|---|---|
| 3,360,129 A | 12/1967 | Powers | |
| 4,129,904 A * | 12/1978 | Pansini | 4/490 |
| 6,792,956 B2 * | 9/2004 | Bredo et al. | 134/22.18 |
| 6,942,790 B1 | 9/2005 | Dolton | |
| 7,001,509 B1 | 2/2006 | Lin | |
| 7,180,503 B2 | 2/2007 | Burr et al. | |
| 2002/0096198 A1 * | 7/2002 | Bredo et al. | 134/22.18 |
| 2007/0152638 A1 * | 7/2007 | Deprun | 320/134 |

FOREIGN PATENT DOCUMENTS

FR   2729995 A1 *  8/1996

* cited by examiner

*Primary Examiner* — Fred Prince
(74) *Attorney, Agent, or Firm* — Tracy Jong Law Firm; Tracy P. Jong; Cheng Ning Jong

(57) ABSTRACT

An aquarium cleaner system for cleaning the bottom surface of an aquarium. The system has a suction means with a suction body. The suction body has an open enlarged lower end, an open upper end and a propeller system. There is also a filter with an opening fluidly connected to the open upper end of the suction body, an impurities entrapment surface and a fluid return surface. There is further provided a controller for turning on or off the suction means according to a preprogrammed schedule and a random position effecter, such that when a new cleaning position is desired, the suction means is terminated for a first predetermined duration so that the suction body causes the aquarium bottom cleaner to rise from the current cleaning position before turning on the suction means for a second predetermined duration.

17 Claims, 10 Drawing Sheets

AQUARIUM BOTTOM CLEANER SYSTEM

BACKGROUND OF THE INVENTION

1. The Field of the Invention

The present invention is directed generally to aquarium cleaners, and more particularly, to an automatic untethered aquarium bottom cleaner system.

2. Background Art

As it is well known to a pet fish hobbyist, a clean and healthy ecosystem free from excessive levels of nitrite and algae is key to prevent fish loss and is also more aesthetically pleasing than a neglected ecosystem. Numerous types of aquarium cleaners or filtration systems have been attempted in the past. A widespread solution for cleaning a tank involves using a filtration system where water is suctioned from a tank via an inlet nozzle, put through filtering element of charcoal and sponge, and returned to the tank via an exhaust tubing or by gravity in the form of a waterfall. In such a system, the inlet nozzle is usually statically positioned several inches below the water level and disposed on one end of the filtration system. The exhaust returns the filtered water on an opposing end of the filtration system. Such a system requires that the filtration system be placed outside of a tank, necessitating large cutouts and other modifications to a tank hood or cover before the installation of such a filtration system is possible.

U.S. Pat. No. 7,001,509 to Lin discloses an exemplary waterfall type filtration system that is mounted on a top edge of an aquarium. Such a filtration system relies on gravity of falling water in the immediate area just below the spillway in order to create agitation which drives water/debris mixture to the filtration intake. As such, areas outside of the influence of the falling water and intake remain uncleansed. It is also possible that debris within the influence of such filtration system is carried and deposited in areas outside of the agitation provided by the filtration system, thereby causing debris to be simply moved from one location to another within the tank.

Another widespread solution for cleaning a tank involves the use of a filtration system having a container that contains a filtering media. The container is disposed within a tank, usually at a corner or the base of the tank. Such a system usually relies on an aeration system to create negative pressure and sufficient agitation in order to draw in debris which can become entrapped in the filtering media. One common drawback to these statically positioned filtering systems lies in their inability to provide cleaning to the entire base area of a tank. Filtration systems such as these are typically large as they are designed to perform filtration over an extended period of time and a large tank base. Such large filtration systems can become unsightly and can take up a good part of a tank while creating traumatic experience to some pet fish due to the large disturbances caused by the water jets associated with such filtration systems. In addition, debris trapped in gravel further presents a challenge for such a static system to clean since increased local agitation of the debris is required to loosen the debris from the gravel which is not provided by any of the existing filtration system.

An aquarium may alternatively be cleaned manually. The inlet of a siphon hose is positioned where the debris is to be removed from manually. Often times, a user is required to position his/her hand in the water of the tank in order to properly guide the suction head. Since siphoned water is emptied into the drain without treatment or being reused, such a practice wastes water and not environmentally friendly.

U.S. Pat. No. 3,360,129 to Powers discloses a gravel cleaner for aquariums that is composed of a hollow base member having a side wall, an open lower end adapted to seat in the particulate bed of a functioning aquarium with an air tube extending into the member and having a lower end positioned within the interior thereof to discharge air into the bed and agitate it and to create a vacuum in the base member with its side wall having apertures above the tube's lower end for water to enter the base member under the vacuum conditions therein and a water outflow tube at the side wall above the apertures with a disposable porous filter on the outer end of the outflow tube to entrap impurities from the discharging water. The positioning of the lower end of the hollow base member on the gravel is effected manually and external air supply is required to create the suction required to draw water into the cavity of the base member, thereby making this cleaner dependent upon external accessories and not self-contained for routine operation.

Suction heads guided by various crawler-type submersibles have been designed to traverse and clean the bottom of swimming pools. However, in order to provide suction to the bottom of a body of water, a power source is generally provided at the surface, thereby necessitating the use of a power cord that runs from above the water surface to the bottom of a swimming pool. In certain applications, the filtration system is disposed at or above the water surface. One such system is disclosed in U.S. Pat. No. 6,942,790 to Dolton which describes the use of an open-air filtration device to clean swimming pools and hot tubs. In this system, water containing debris is pumped to a level above the swimming pool or hot tub surface. The debris containing water is discharged through a spout into a filter tube. A filter element associated with the filter tube, and open to atmosphere filters the debris containing water by gravitational forces solely. The spout and filter tube are, optionally, attached to a pole that manually propels the suction unit. They may alternatively be attached to a floating platform that floats on the water surface of the pool or hot tub. The use of a scaled version of this type of cleaner in a fish tank environment is impractical since the positioning of a suction head is guided by a pole and communicates with the surface with a power cord and a suction hose, all of which runs the depth of the body of water. A fish tank environment is usually littered with various decorations or ornamentations which present snagging hazards to such equipment that tether the suction head.

In view of the foregoing drawbacks in the art, there exists a need for an aquarium cleaner which can adequately clean the entire base of an aquarium without creating undue trauma to pet fish, robbing valuable usable volume from an aquarium and/or presenting snagging hazards to an aquarium environment.

SUMMARY OF THE INVENTION

In accordance with the present invention, there is provided an aquarium bottom cleaner system for cleaning a bottom surface of an aquarium, wherein the aquarium bottom cleaner system comprises a suction means, a powering means, a controlling means, an automatic positioning means and a filtering means. The suction means is powered by the powering means to move untreated water to be processed by the filtering means to produce a filtered return flow. The automatic positioning means cooperates with the controlling and suction means to move the aquarium bottom cleaner system from a current cleaning position to a new cleaning position.

The suction means comprises a naturally buoyant suction body having an open enlarged lower end, an open upper end and a propeller system. The enlarged lower end is adapted to be seated on the bottom surface of the aquarium and the open enlarged lower end is connected to the open upper end and the propeller system creates an untreated flow from the open enlarged lower end to the open upper end.

The filtering means comprises a dome shaped filter housing having an interior surface and a dome shaped filter having an opening, an impurities entrapment surface and a fluid return surface, wherein the untreated flow is received at the opening of the filter and forced through the impurities entrapment surface, leaving behind impurities on the impurities entrapment surface and creating a filtered return flow in a cavity defined by the fluid return surface of the filter and the interior surface of the filter housing. The filter further comprises a lock disposed about the opening of the filter and configured to mate with the suction body such that the untreated flow is received through the opening of the filter and the filter is readily removable from the suction body and cleansed using a water flow adapted to flow from the fluid return surface to the impurities entrapment surface to discard impurities for reuse. The filter further comprises a ledge disposed substantially on an inner periphery of the opening of the filter to prevent release or fallback of waste material into the aquarium.

The propeller system comprises a propeller having an axis of rotation and an eccentric shaft eccentrically disposed with respect to the axis of rotation. The aquarium bottom cleaner system further comprises an agitating means including an agitator configured to be coupled to the eccentric shaft of the propeller such that the rotary motion of the propeller powers the agitator. The agitator comprises at least an elongated agitator member having a first end, a second end, an arm extending at a substantially right angle from the second end and an elongated slot, wherein the elongated slot is disposed between the first and second ends. The first end is pivotably connected to the eccentric shaft of the propeller and the elongated slot is slidingly and pivotably mounted to a pin fixedly attached to an attachment point in a plane substantially perpendicular to the axis of rotation on the suction body such that when the propeller rotates, the arm moves in a circular trajectory having a radius, at a speed to cause agitation on the bottom surface of the aquarium. The attachment point is configured to be fixable to any radial position from the axis of rotation within the plane such that the speed and radius of the circular motion are modifiable.

The automatic positioning means comprises a random position effecter which includes an annular cavity, a plurality of directional intake flow apertures, a plurality of plug balls and a plurality of substantially symmetrically disposed exhaust flow apertures along an outer radial periphery of the annular cavity. A portion of the filtered return flow is received through the plurality of directional intake flow apertures and directed into the annular cavity to form a flow which directs each plug ball to plug an exhaust flow aperture, leaving at least one exhaust flow aperture unplugged such that the filtered return flow can be exhausted to create a force which propels the aquarium bottom cleaner laterally from a current cleaning position to a new cleaning position.

The powering means comprises a replenishable power supply and a docking means, wherein the replenishable power supply comprises a rechargeable battery disposed within the suction body and is rechargeable by a slave charging device. The slave charging device is configured to be powered by a master charging device disposed on a wall of the aquarium at about the water level when the slave charging device is docked by the docking means to the master charging device. In one embodiment, the docking means comprises a magnet configured to come within magnetic attraction of a docking base disposed in the vicinity of the master charging device such that the slave charging device is powered by the master charging device.

The controlling means controls the turning on or off of the suction means, whereby when the naturally buoyant suction means is turned on according to a first task, the aquarium bottom cleaner system is laterally translated by the automatic positioning means and lowered to a portion of the bottom surface and when the naturally buoyant suction means is turned off according to a second task, the aquarium bottom cleaner system rises. The controlling means is configured to run a schedule comprising the first and second tasks such that the bottom surface of the aquarium is cleaned in its entirety.

It is a primary object of the present invention to provide an untethered aquarium bottom cleaner system capable of cleaning the bottom surface of an aquarium substantially in its entirety.

It is another object of the present invention to provide an automatic aquarium bottom cleaner system capable of cleaning the bottom surface of an aquarium substantially in its entirety without human intervention.

It is yet another object of the present invention to provide an agitator for aiding in dislodging solid impurities from a bottom surface of an aquarium so that such impurities can be sucked up by the suction means to be filtered by a filtering means.

It is a further object of the present invention to provide an automatic positioning means for enabling cleaning operation at multiple positions on the bottom surface of an aquarium.

It is a further object of the present invention to provide a powering means capable of replenishing power of the present untethered aquarium bottom cleaner system in a aquarium without removing the same from the aquarium.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification and claims. Also it is to be understood that the phraseology and terminology employed herein are for the purpose of description and should not be regarded as limiting.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
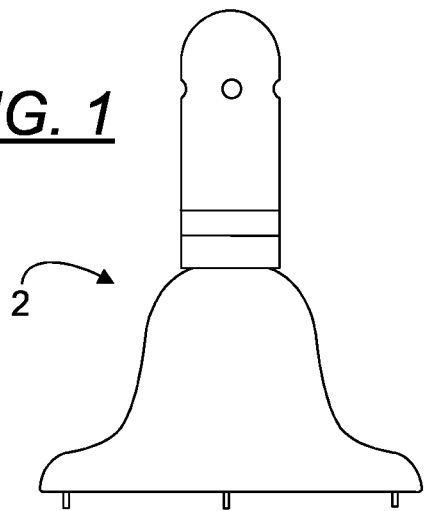
FIG. 1 is a front orthogonal view of an aquarium bottom cleaner system ("cleaner system").

The drawings are not to scale, in fact, some aspects have been emphasized for a better illustration and understanding of the written description.

PARTS LIST

2—aquarium bottom cleaner system
3—aquarium bottom surface
4—agitating means
5—agitator
6—elongated agitating member
7—first end of elongated agitating member
8—suction means
9—second end of elongated agitating member
10—suction body
11—arm
12—automatic positioning means
13—arm trajectory
14—random position effecter
15—annular cavity
16—filtering means
17—flow path
18—filter adaptor
19—filter housing opening
20—filter
21—filter opening
22—filter housing
23—relay
24—rechargeable battery
25—impurities entrapment surface of filter
26—motor
27—fluid return surface of filter
28—propeller
29—propeller hub
30—ledge
31—battery power level detector
32—debris
33—controlling means
34—controller
35—propeller axis of rotation
36—eccentric shaft
37—small screen
38—composite screen
39—large screen
40—power supply compartment
43—flow deflector
42—return flow aperture
44—steer aperture
45—deflected flow
46—exhaust flow plug ball
47—environment outside of annular cavity
48—female screw thread
50—male screw thread
52—filter housing retainer
54—filter housing lock
56—filter retainer
58—filter lock
59—untreated flow
60—filtered return flow
62—elongated slot
64—pin
66—direction of travel
68—direction of exhaust
70—water level
72—aquarium
74—master charging device
76—slave charging device
78—docking means
79—docking base
80—direction of propeller rotation
82—buoyancy aid
84—filter effluent exhaust
86—ridge
88—portion of filtered return flow through filter effluent exhaust
90—portion of filtered return flow through steer aperture
92—air pocket
94—enlarged lower end of suction body
96—upper end of suction body
98—cavity defined by fluid return surface of filter and interior surface of filter housing
100—support for docking base and slave charging device
102—wall electrical plug
104—manual switch Definitions of Terms Used in this Specification The untethered aquarium bottom surface cleaner shall have equivalent nomenclature, including: the aquarium bottom cleaner system, the cleaner system, the present invention, or the invention. Additionally, the term "exemplary" shall possess only one meaning in this disclosure; wherein the term "exemplary" shall mean: serving as an example, instance, or illustration.

Particular Advantages of the Invention

The present cleaner system enables cleaning of the bottom surface of an aquarium in its entirety without installation of a cleaning system that is permanent or semi-permanent, thereby affording flexibility that comes with an untethered cleaner system. It also enables the cleaning of the entire bottom surface of an aquarium without requiring strong water jets which can cause distress to aquatic life in the aquarium. Instead, the present cleaner system utilizes an agitator that is localized to a position being cleaned. The present cleaner system utilizes a locomotion means that is the combination of a simple random position effecter, a return flow, a naturally buoyant suction body and a preprogrammed schedule for effecting the return flow. Hence, the present cleaner system does not require a complex path planner for navigating the bottom surface of an aquarium. The random position effecter neither requires an additional power source for operation nor does it require a complex path planner for navigating the bottom surface of an aquarium. The present cleaner system is untethered but receives power automatically from a master charging device such that the cleaner system does not need to be removed from an aquarium for power replenishment. As the cleaner system is untethered in operation, it does not present undue trauma to pet fish or rob valuable usable volume from an aquarium and/or present snagging hazards to an aquarium environment.

DETAILED DESCRIPTION OF A PREFERRED EMBODIMENT

Figure 2:
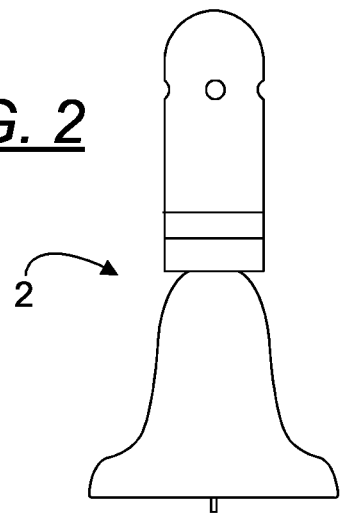
FIG. 2 is a side orthogonal view of a cleaner system.
Figure 3:
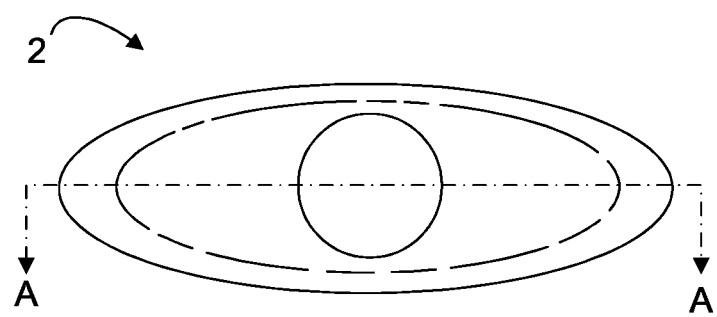
FIG. 3 is a plan view of a cleaner system.
Figure 4:
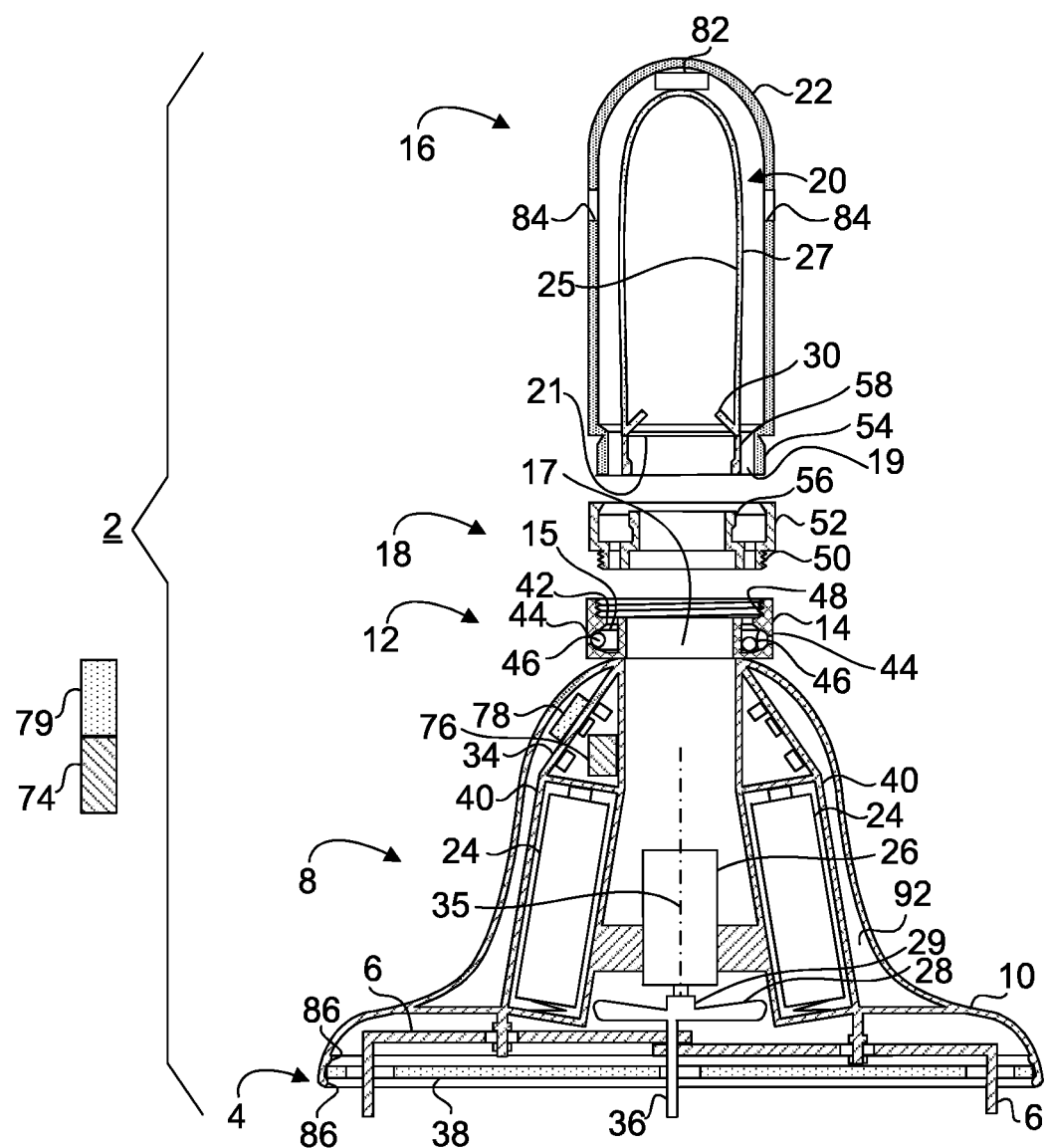
FIG. 4 is a front orthogonal exploded cross-sectional view of a cleaner system taken along line AA of FIG. 3.
Figure 5:
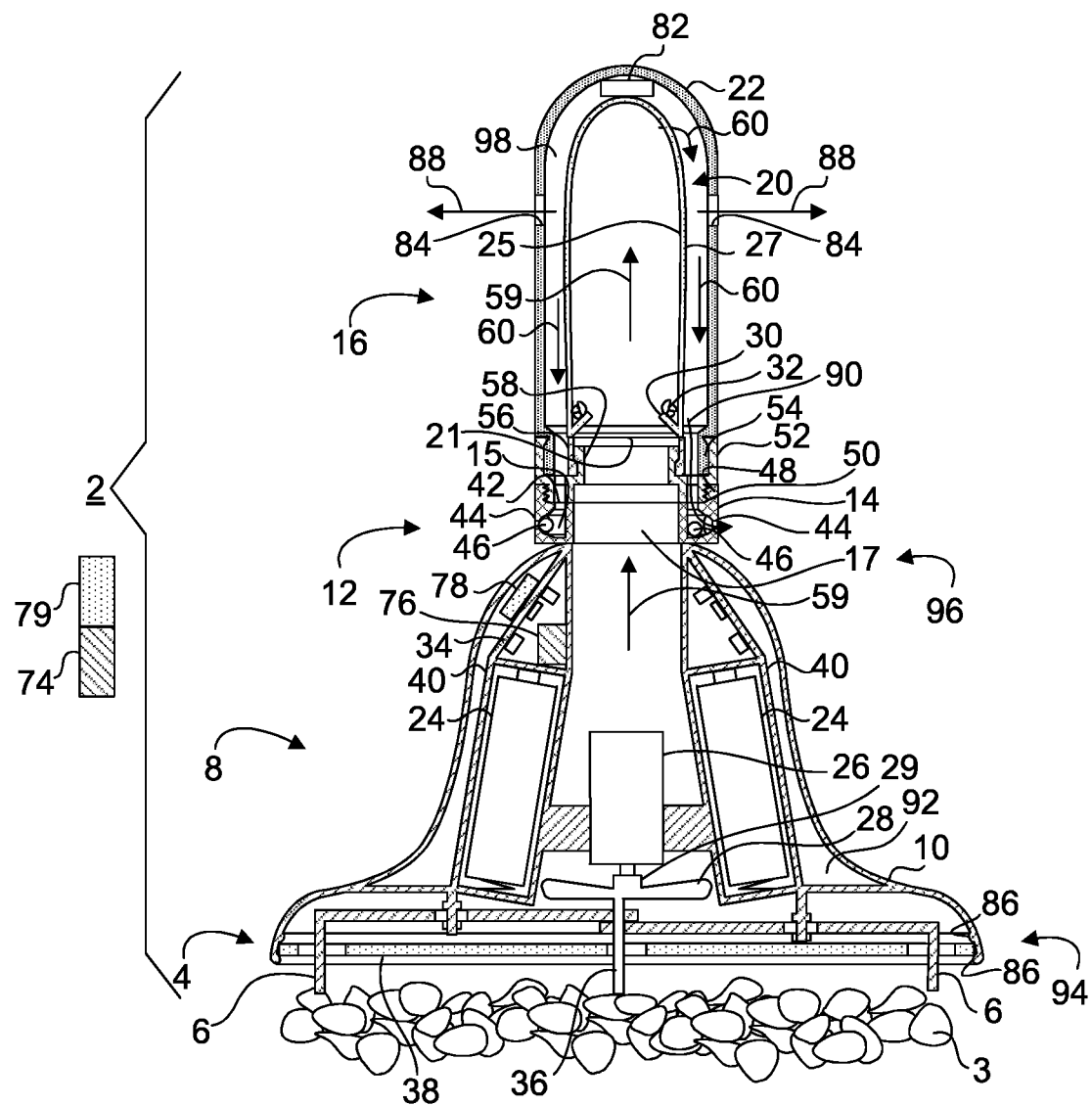
FIG. 5 is a front orthogonal cross-sectional view of an assembled cleaner system taken along line AA of FIG. 3.
Figure 6:
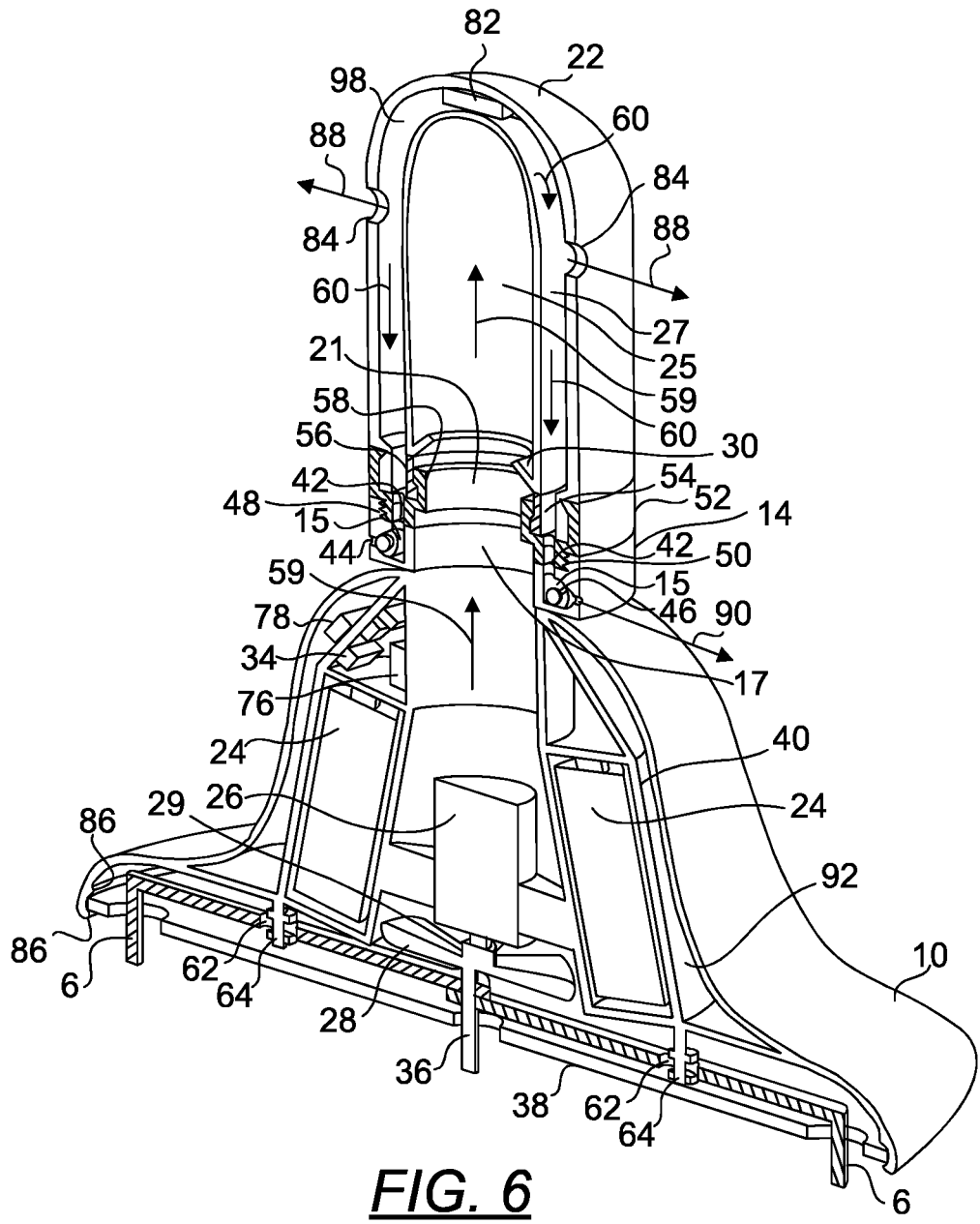
FIG. 6 is a front perspective cross-sectional view of an assembled cleaner system taken along line AA of FIG. 3.

FIGS. 1, 2 and 3 are front orthogonal, side orthogonal and plan view, respectively, of an aquarium bottom cleaner system 2. FIG. 4 is a front orthogonal exploded cross-sectional view of a cleaner system 2 taken along line AA of FIG. 3. FIGS. 5 and 6 are front orthogonal cross-sectional and front perspective cross-sectional view, respectively, of an assembled cleaner system 2 taken along line AA of FIG. 3. Referring especially to FIGS. 4, 5 and 6, the cleaner system 2 comprises a suction means 8, a powering means, a controlling means, an automatic positioning means 12 and a filtering means 16. The suction means 8 is powered by the powering means to move untreated water to be processed by the filtering means 16 to produce a filtered return flow 60 (see FIGS. 5 and 6). The automatic positioning means 12 cooperates with the controlling means and the suction means 8 to move the cleaner system 2 from a current cleaning position to a new cleaning position as will be demonstrated and discussed with respect to FIGS. 7, 18 and 19.

The suction means 8 comprises a naturally buoyant suction body 10 having an open enlarged lower end 94, an open upper end 96 and a propeller system. The open enlarged lower end is adapted to be seated on a bottom surface of an aquarium (see FIGS. 5, 7, 18 and 19) and the open enlarged lower end is fluidly connected to the open upper end. The propeller system creates an untreated water flow from the open enlarged lower end to the open upper end.

The propeller system comprises a propeller 28 having a propeller hub 29, an axis of rotation 35 and an eccentric shaft 36 eccentrically disposed parallel to and at an offset with respect to the axis of rotation 35 and fixedly attached to the propeller hub 29. The propeller 28 is in turn adapted to and powered by a motor 26. In one embodiment, the propeller system is configured to provide net suction pressure of from about 5 to about 15 psi.

The powering means comprises a replenishable power supply and a docking means 78, wherein the replenishable power supply comprises a rechargeable battery 24 disposed within the suction body 10 in a watertight compartment 40 and is rechargeable by a slave charging device 76 configured to be powered by a master charging device 74 disposed remotely from the slave charging device 76.

Figure 7:
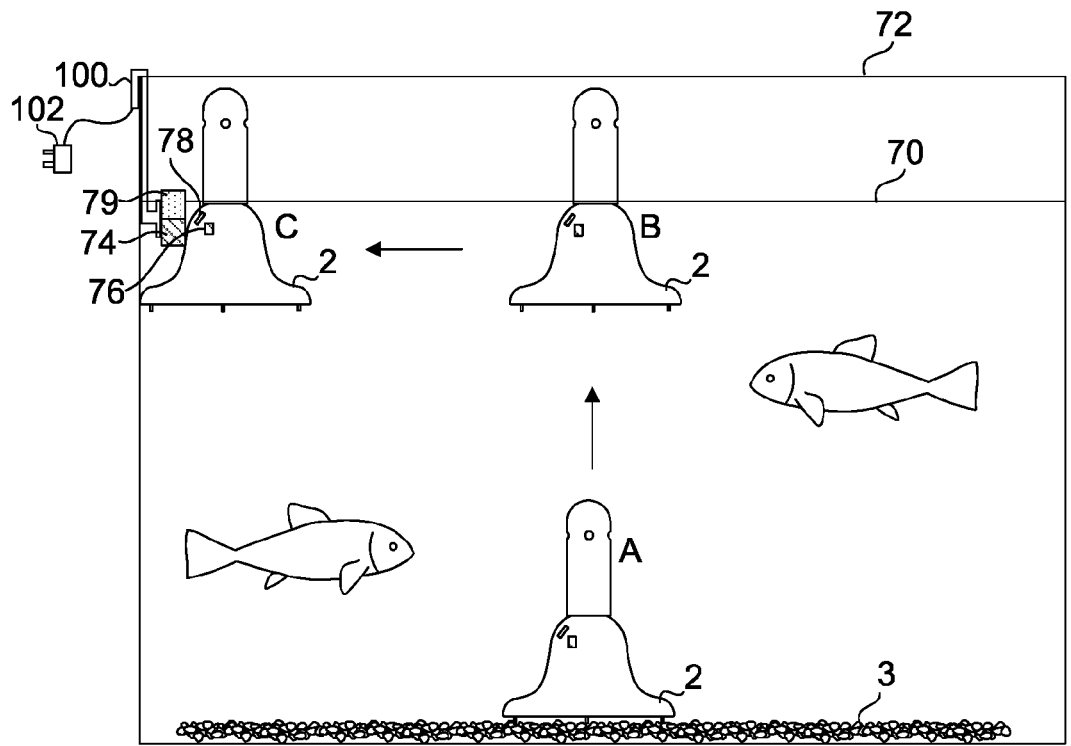
FIG. 7 is a diagram depicting a method by which the power supply of the present cleaner system is automatically replenished.
Figure 8:
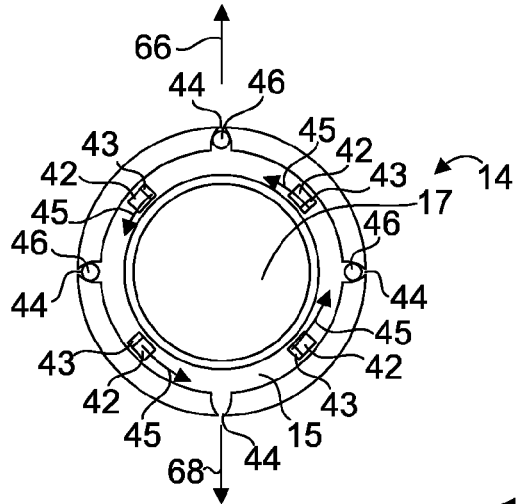
FIGS. 8 to 11 are top orthogonal cross-section views of a random position effecter according to the present invention, depicting the random position effecter aligned to move in four different directions.
Figure 9:
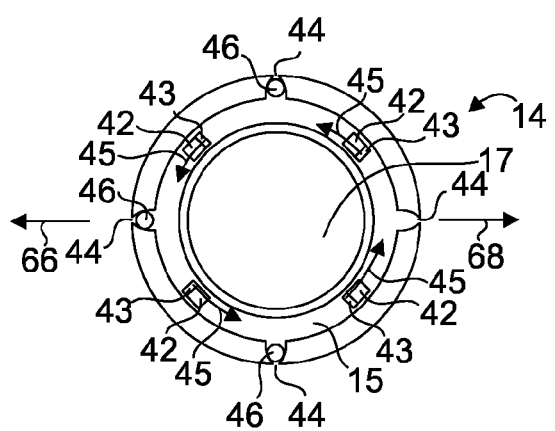
Figure 10:
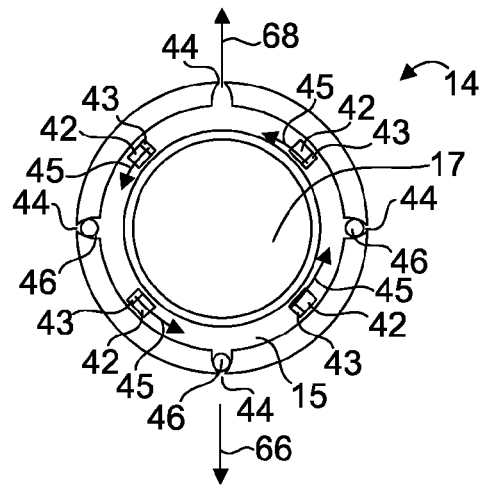
Figure 11:
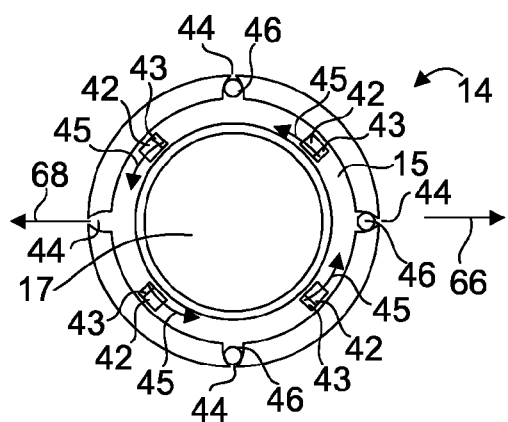

FIG. 7 is a diagram depicting a method by which the power supply of the aquarium bottom cleaner system 2 is automatically replenished while in use in an aquarium 72 having water level 70. Upon power exhaustion, the cleaner system 2 floats by buoyancy to the water level 70 of the aquarium 72. By a random process and/or with aid of a separate aeration system, the cleaner system 2 eventually drifts to the vicinity of the docking base 79 such that the docking means 78 is attracted weakly by the docking base 79. In one embodiment, each of the docking means 78 and docking base 79 is a magnet. In use, a support 100 provides attachment points for the docking base 79 and the master charging device 74. A wall electrical plug 102 operably connected to the master charging device 74 is plugged into and receives power from an electrical outlet.

Referring generally to FIGS. 4 to 7, the master charging device 74 is configured such that upon entering the magnetic attraction of the docking base 79, the slave charging device 76 is energized in order to charge the rechargeable battery 24 operably connected to the slave charging device 76 and retained in a watertight compartment 40. Upon determining that a predetermined amount of energy has been stored in the rechargeable battery 24, the controller 34 causes the motor 26 to turn on such that cleaning can resume. An exemplary induction charging device such as one used herein has been disclosed in U.S. Pat. No. 7,180,503 to Burr et. al., said patent is hereby incorporated by reference in its entirety. The present master charging device 74 and slave charging device 76 are akin to the source loop and victim loop respectively of the 503' patent. It shall be understood that a non-rechargeable battery may be used in lieu of the rechargeable battery 24. If a non-rechargeable battery is used, the aquarium bottom cleaner system must be removed from the aquarium and dried prior to opening the watertight compartment and replacing the non-rechargeable battery. In an embodiment where a non-rechargeable battery is used, a master charging device 74 will not be provided or utilized.

Referring to FIGS. 4, 5 and 6, the filtering means 16 comprises a dome shaped filter housing 22 having an interior surface and an opening 19 and a dome shaped filter 20 having an opening 21, an impurities entrapment surface 25 and a fluid return surface 27, wherein the untreated flow 59 is received at the opening 21 and forced through the impurities entrapment surface 25 of the filter 20, leaving behind impurities on the impurities entrapment surface 25 and creating a filtered return flow 60 in a cavity 98 defined by the fluid return surface 27 of the filter and the interior surface of the filter housing 22.

In one embodiment, a ledge 30 is further provided and disposed substantially on an inner periphery of the opening 21 of the filter 20. The ledge 30 entraps debris 32 such as larger pieces of rotting aquatic plant materials, unconsumed fish food, gravel, fish droppings and the like which are too large to adhere to the impurities entrapment surface 25 and gravitate to the ledge 30 due to their weight or upon cessation of the suction means 8. In one embodiment, the filter is made of a material having a micron rating of from about 25 to about 100 micron.

A portion of the filtered return flow 60 exits a plurality of filter effluent exhausts 84 as in direction 88 while another portion of the filtered return flow 60 is directed to exit through one of the plurality of steer apertures 44. The plurality of filter effluent exhausts 84 is disposed about the filter housing 22 and configured such that a portion of the filtered return flow 60 exits laterally in direction 88 to create exit flows. Reaction forces generated by these exit flows are balanced to cause substantially zero tendency for the cleaner system 2 to move laterally. The size and location of filter effluent exhausts 84 and steer apertures 44 are appropriately configured such that the volumetric flowrate ratio of the portion of the flow exiting the filter effluent exhausts 84 and a steer aperture 44 is maintained at from about 5:1 to 10:1.

Continuing to refer generally to FIGS. 4 to 6, a filter adaptor 18 is provided to serve as an interface which permits removal of the filter 22 for cleansing. The filter adaptor 18 comprises a male screw thread 50 on one end that is configured to be mated to a female screw thread disposed on the random position effecter 14. On the opposing end, the filter adaptor 18 comprises a filter retainer 56 configured to secure a filter lock 58 disposed along the periphery of the opening of the filter 21 and a filter housing lock 52 configured to secure a filter housing lock 52 disposed along the periphery of the opening 19 of the filter housing 22.

An exemplary filter or filter housing retainer-lock combination is a snap-fit mechanism. In order to remove the filter 20 for cleansing, the filter housing is first removed by squeezing the filter housing 22 about the retainer 54 followed by pulling the filter housing 22 away from the filter adaptor 18. The filter 20 is then removed by squeezing the filter 20 about the filter retainer 56 followed by pulling the filter 20 away from the filter adaptor 18. In order to install the filter 20, the filter retainer 56 is again squeezed and pushed against the filter lock 58 until the filter retainer 56 snaps into place to form a secure attachment to the filter lock 58. The retainer 54 is then squeezed and pushed against the filter housing lock 52 until the retainer 54 snaps into place and securely attached to the filter housing lock 52.

A composite screen 38 is disposed at the enlarged lower end of the suction body 10. The composite screen 38 prevents intake of large pieces of materials which upon entry in the suction body would halt proper operation of the motor 26 and filter 20. During installation, the composite screen 38 is substantially aligned coplanar with the plane defining the periphery of the enlarged lower end of the suction body and pushed against the same such that the composite screen 38 rests between and retained by two ridges 86. In order to remove the composite screen 38, the same is secured and pulled in a direction away from the enlarged lower end of the suction body 10.

In one embodiment, the buoyancy of cleaner system 2 is provided by the material used in the construction of the cleaner system 2 alone. In a preferred embodiment, air pockets 92 are built into the suction body 10 as demonstrated in FIGS. 4, 5 and 6 to provide additional natural buoyancy. In the embodiment shown in FIGS. 4, 5 and 6, a buoyancy aid 82 comprising a Styrofoam or a removable enclosed air pocket may alternatively be used to substitute buoyancy provided by built-in air pockets 92 or to supplement the buoyancy provided by other means to the suction body 10. In one embodiment, the buoyancy aid 82 is disposed just below and inside the top of the dome shaped filter housing 22.

Figure 12:
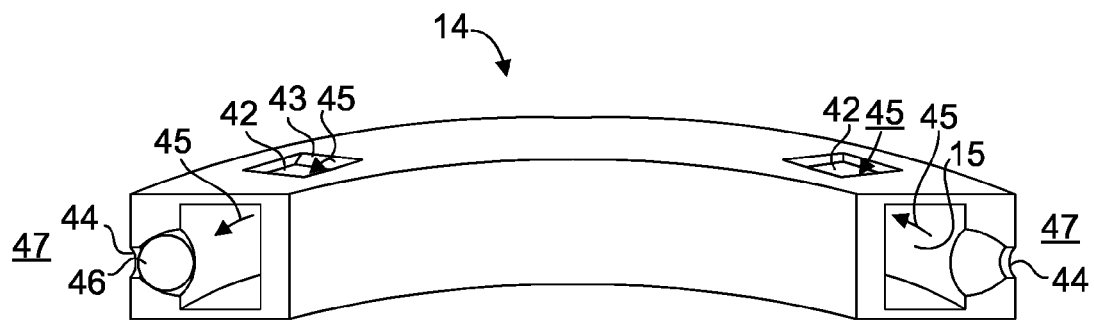
FIG. 12 is a partial top perspective view of the random position effecter according to the present invention, depicting spatial relationships between a portion of the annular cavity, exhaust apertures and plug balls.

FIGS. 8 to 11 are top orthogonal cross-section views of a random position effecter 14 according to the present invention, depicting the random position effecter 14 aligned to move in four different directions. FIG. 12 is a partial top perspective view of the random position effecter 14, depicting spatial relationships between a portion of the annular cavity 15, steer apertures 44 and plug balls 46. Referring to FIGS. 4, 5, 8 to 11 and 12, the automatic positioning means 12 comprises a random position effecter 14 which includes an annular cavity 15, a flow path 17, a plurality of directional intake flow apertures 42, a plurality of plug balls 46 and a plurality of substantially symmetrically disposed steer apertures 44 along the outer radial periphery of the annular cavity 15. The flow path 17 connects the upper end of the suction body 10 to the opening 21 of the filter 20. The filtered return flow 60 is received through the plurality of directional intake flow apertures 42 and directed into the annular cavity 15 to form a flow which directs each plug ball 46 to plug a steer aperture 44, leaving at least one steer aperture 44 unplugged such that the deflected flow 45 can be exhausted in direction 68 to create a force which propels the cleaner system 2 in direction 66 of travel opposing the direction of the filtered return flow 60 exiting the unplugged steer aperture 44 and laterally from a current position to a new position. A flow deflector 43 is disposed on at least a portion of each of the directional intake flow apertures 42. In one embodiment, the flow deflector is a surface disposed at an angle to the filtered return flow 60, which upon impact of the same causes the same to flow in a direction substantially coplanar to the surface as indicated by deflected flow 45. A pressure difference between the annular cavity 15 and the environment outside 47 (see FIG. 12) of the annular cavity 15 causes each plug ball 46 to draw towards and plug a steer aperture 44. There is provided a number of plug balls 46 that is less than that of the number of steer apertures 44 such that at least one steer aperture 44 is left unplugged at any time. An unplugged steer aperture 44 enables a deflected flow 45 to exit in direction 68 to create a force in direction 66 to cause lateral translation of the cleaner system 2. It shall be understood that the steer apertures 44 may alternately disposed non-symmetrically along the outer radial periphery of the annular cavity 15 provided that the number of plug balls 46 remains less than the number of steer apertures 44.

Figure 13:
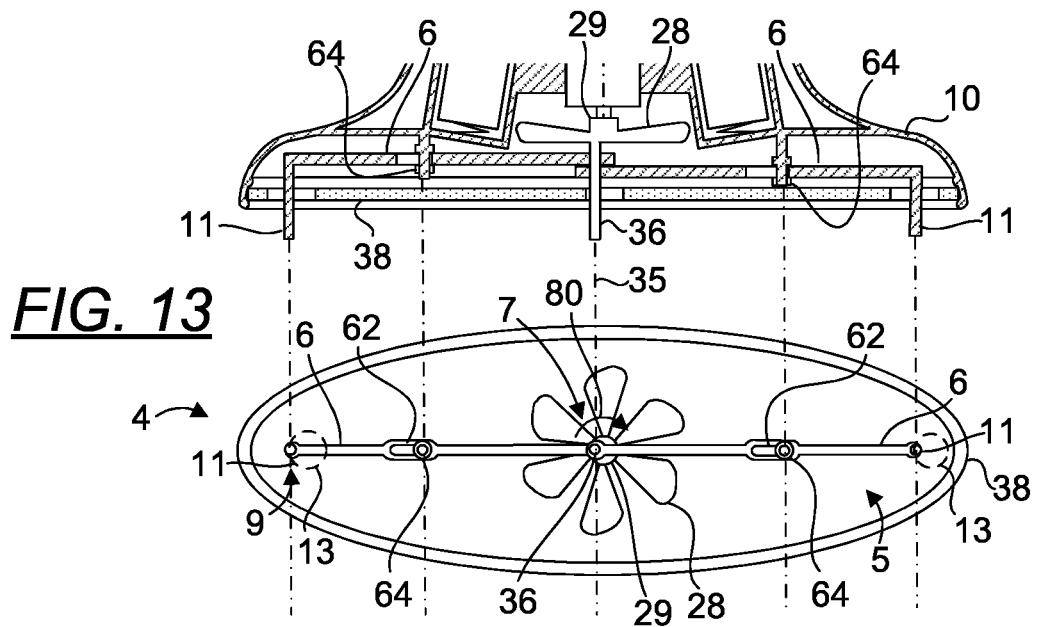
FIGS. 13 and 14 are each a combination partial front orthogonal view and bottom orthogonal view of an agitator means according to the present invention, depicting spatial and operational relationships between the propeller and agitator.
Figure 14:
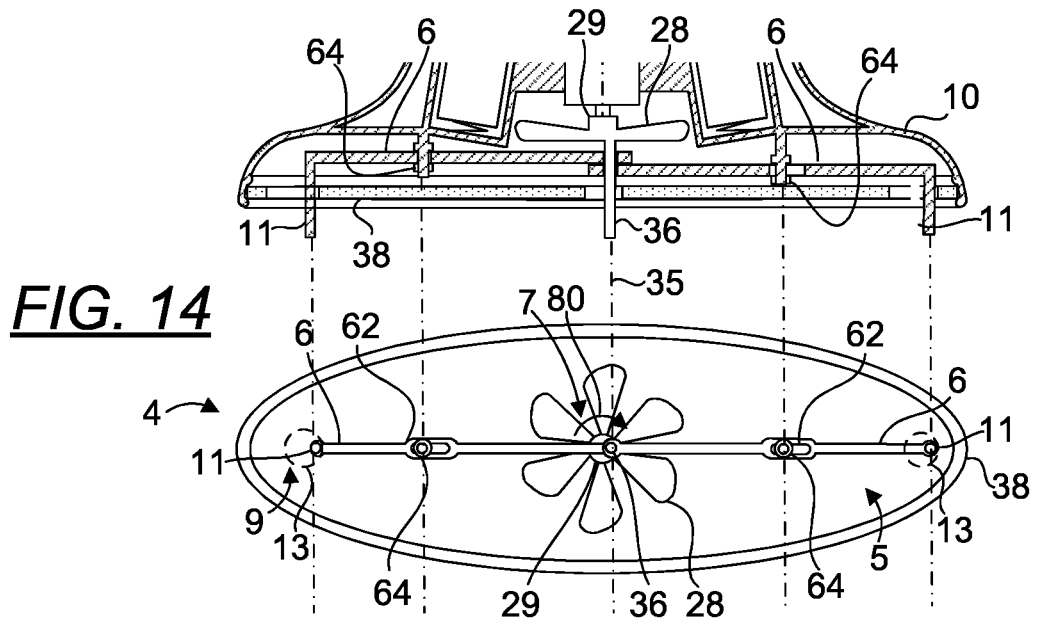

FIGS. 13 and 14 are each a combination partial front orthogonal view and bottom orthogonal view of an agitating means 4 according to the present invention, depicting the relationship between the propeller 28 and agitator 5. FIG. 13 depicts a scenario where the eccentric shaft 36 is disposed on the left side of the axis of rotation 35 while FIG. 14 depicts a scenario where the eccentric shaft 36 has rotated in direction 80 to the right side of the axis of rotation 35. The agitator 5 comprises a plurality of elongated agitating members 6, each having a first end 7, a second end 9, an arm 11 extending at substantially right angle from the second end 9 and an elongated slot 62 which essentially functions as a scotch yoke mechanism. The agitator 5 is adapted to cooperate with and receive power from the propeller 28 to cause agitation. The elongated slot 62 is disposed between the first 7 and second 9 ends, the first end 7 pivotably connected to the eccentric shaft 36 of the propeller hub 29 and the elongated slot 62 slidingly and pivotably mounted to a pin 64 fixedly attached to an attachment point in a plane substantially perpendicular to the axis of rotation 35 of the propeller 28 such that when the propeller rotates, the arm 11 moves in a circular trajectory having a radius, at a speed corresponding to the rotation of the propeller and causes agitation on the bottom surface of the aquarium. The agitator 5 is coupled to an eccentric shaft 36 formed as part of the propeller hub 29 such that the rotary motion of the propeller 28 causes the second end 9 of each elongated agitating member 6 to assume an circular trajectory 13 while a pin 64 slides along the elongated slot 62. The diameter of the circular trajectory 13 is inversely proportional to the distance between the propeller hub 29 and the pin 64. As the pin 64 is positioned closer to the propeller hub 29, the circular trajectory 13 becomes larger. The eccentric shaft 36 further aids in causing agitation, especially in the center portion of the enlarged lower end of the suction body 10. In use, the agitator 5 is mounted on the enlarged lower end of the suction body 10.

Figure 15:
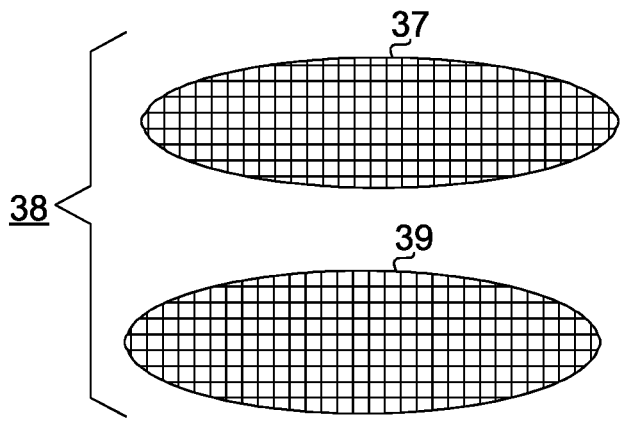
FIG. 15 is a bottom orthogonal view of a pair of screens configured to form a composite screen.
Figure 16:
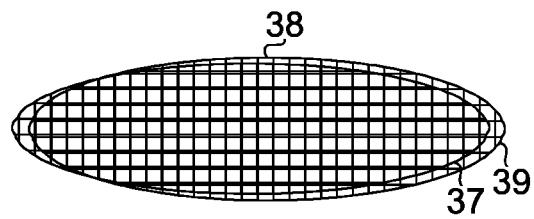
FIG. 16 is a bottom orthogonal view of a pair of screens positioned to form a composite screen with openings of the pair substantially aligned.
Figure 17:
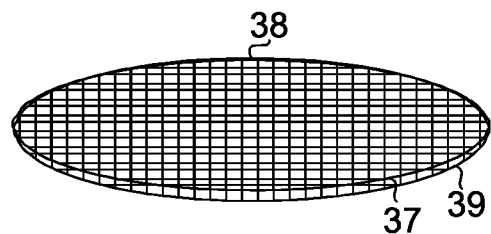
FIG. 17 is a bottom orthogonal view of a pair of screens positioned to form a composite screen with openings of the pair substantially shifted.

FIG. 15 is a bottom orthogonal view of a pair of screens 37, 39 configured to form a composite screen 38. In use and when installed at the enlarged lower end of the suction body 10, the composite screen 38 prevents accidental suction of fish or other aquatic life into the suction body 10. When installed over the agitator 5, appropriate gaps are made in the composite screen 38 to enable protrusions of arms 11 through the composite screen 38. In constructing a composite screen 38, a small screen 37 is overlaid on top of a large screen 39 such that the resulting composite screen 38 has openings that are the same size or smaller than the small or large screen 37, 39 in its uncombined state. FIG. 16 is a bottom orthogonal view of a pair of screens 37, 39 positioned to form a composite screen 38 with openings of the pair substantially aligned. The openings are essentially the same size as the openings of each of the small or large screen 37, 39. FIG. 17 is a bottom orthogonal view of a pair of screens 37, 39 positioned to form a composite screen 38 with openings of the pair substantially shifted. The resulting openings are smaller than the openings of any one of the small or large screens 37, 39.

Figure 18:
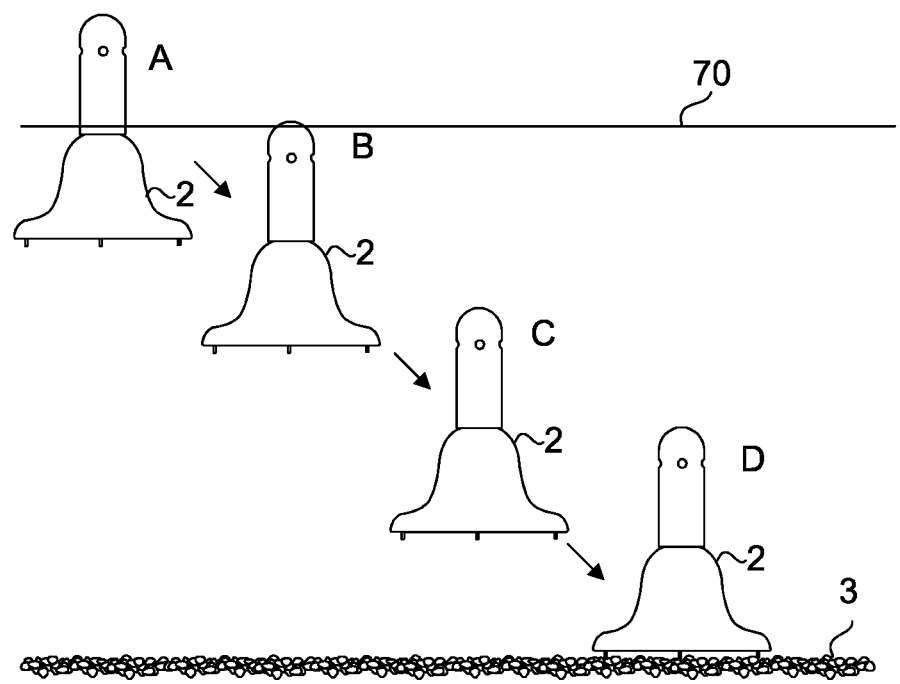
FIG. 18 is a diagram depicting a method by which the present cleaner system moves from water level to a new cleaning position.

FIG. 18 is a diagram depicting a method by which the cleaner system 2 moves from water level 70 to a new cleaning position. Position A denotes the starting position where the cleaner system 2 is first released in the aquarium or when its controller turns its propeller system back on after the powering means has been sufficiently recharged. As the propeller is energized, it creates a downward force which overcomes the buoyant force provided by the naturally buoyant suction body 10 and/or the buoyancy aid 82 (as shown in FIGS. 4, 5 and 6). As a result, the cleaner system 2 moves downwardly as well as laterally due to the random position effecter through positions B and C until it reaches a bottom surface 3 or gravel at position D in this example. The propeller is kept powered for a second predetermined duration adapted to allow the cleaner system 2 to remain at position D and clean. Once disposed at the bottom surface of the aquarium, a generally downwardly acting suction force aids in retaining the suction body 10 at the bottom surface 3. This downwardly acting suction force is sufficiently large to prevent the suction body from getting moved laterally by the thrust imparted by the exhaust flow through a steer aperture of the random position effecter. Upon expiration of the second predetermined duration, the propeller system is turned off such that the cleaner system 2 can be moved to a new cleaning position as depicted in FIG. 19.

Figure 19:
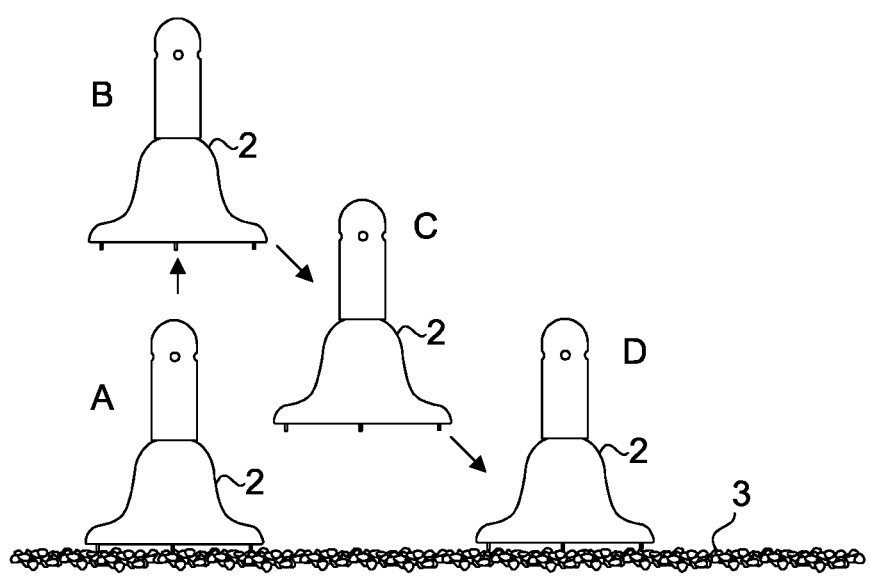
FIG. 19 is a diagram depicting a method by which the present cleaner system moves from a current cleaning position to a new cleaning position.

FIG. 19 is a diagram depicting a method by which the present cleaner system 2 moves from a current cleaning position to a new cleaning position. Position A denotes the starting position where the cleaner system 2 has been located to provide cleaning. Upon expiration of the second predetermined duration allocated for cleaning, the propeller is de-energized for a first predetermined duration. As a result, the buoyant force of the naturally buoyant suction body causes the cleaner system to move upwardly to position B. Upon expiration of the first predetermined duration, the propeller system is again energized such that the suction force created by the propeller system lowers the cleaner system 2 with the enlarged lower end still facing the bottom surface 3 of the tank. As soon as the propeller system is energized, the random position effecter causes the cleaner system to move laterally as well as downwardly to position C and then position D. Hence, the present cleaner system utilizes a locomotion means that is the combination of a random position effecter, a return flow produced by a propeller, a naturally buoyant suction body and a preprogrammed schedule for effecting the return flow. The random position effecter neither requires an additional power source for operation nor does it require a complex path planner for navigating the bottom surface of an aquarium.

Figure 20:
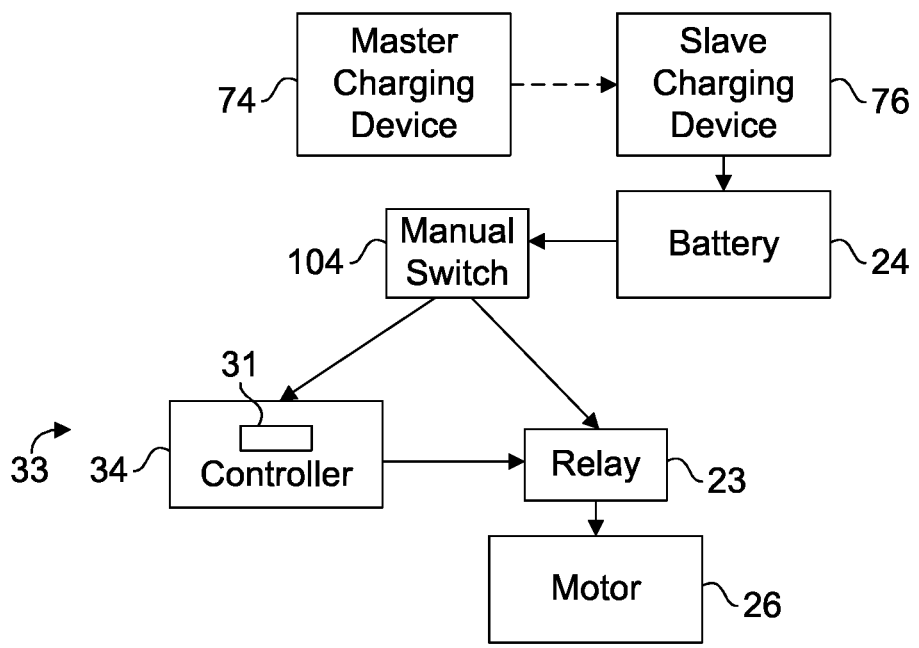
FIG. 20 is a block diagram depicting a controlling means of the present cleaner system.

FIG. 20 is a block diagram depicting a controlling means of the present aquarium bottom cleaner system. The controlling means 33 comprises a preprogrammed schedule for turning on or off the motor 26. The preprogrammed schedule is effectuated via a controller 34 which is operably connected to a relay 23 for controlling the motor 26. A manual switch 104 is operably connected to the controller 34 and the relay 23 to enable or halt the cleaner operation. When the manual switch 104 is disposed in the "on" position, electrical power is supplied from a rechargeable battery 24 to the controller 34 and the relay 23. Otherwise, when disposed in the "off" position, the manual switch 104 removes power from the controller 34 and the relay 23 thereby halting the cleaner operation. When a new cleaning position is desired, the motor 26 is de-energized for the first predetermined duration so that the naturally buoyant suction body causes the cleaner system 2 to rise from the current cleaning position before turning on the motor 26 for a second predetermined duration so that the random position effecter 14 causes the aquarium bottom cleaner system 2 to move laterally in combination with lowering the same onto a new cleaning position on the bottom surface of the aquarium. The schedule is run until the powering means of the cleaner system 2 has dropped to a level insufficient to sustain the motor 26 operation. As a result, buoyancy of the naturally buoyant suction body causes the cleaner system 2 to float to the water level. An exemplary powering means comprises a rechargeable battery 24 operably connected to the relay 23 and a slave charging device 76. Random drift of the cleaner system 2 eventually causes the slave charging device 76 to come into electrical influence of a master charging device 74 which causes the slave charging device 76 to be recharged. There is further provided a battery power level detector 31 which receives a battery power level of the rechargeable battery 24. Upon detecting a power level exceeding that of a predetermined threshold, the controller 34 turns on the relay 23 causing the motor 26 to receive power from the rechargeable battery 24. As a result, the cleaner system 2 is once again driven to the bottom surface the aquarium to resume cleaning.

It will be appreciated by those skilled in the art that while the invention has been described above in connection with particular embodiments the invention is not necessarily so limited and that numerous other embodiments, uses, modifications and departures from the embodiments, and uses may be made without departing from the inventive concepts.

What is claimed is:

1. An aquarium bottom cleaner system for cleaning a bottom surface of an aquarium, wherein said aquarium bottom cleaner system comprises:
    a suction means;
    a powering means;
    a controlling means;
    an automatic positioning means comprising a random position effecter comprising an annular cavity, a plurality of directional intake flow apertures, a plurality of plug balls and a plurality of substantially symmetrically disposed steer apertures along an outer radial periphery of said annular cavity; and
    a filtering means;
    wherein said suction means is powered by said powering means to move untreated water to be processed by said filtering means to produce a filtered return flow, said automatic positioning means cooperates with said controlling means to move said aquarium bottom cleaner system from a current cleaning position to a new cleaning position and wherein a portion of said filtered return flow is received through said plurality of directional intake flow apertures and directed into said annular cavity to form a flow which directs each said plug ball to plug a steer aperture, leaving at least one steer aperture unplugged such that the portion of said filtered return flow can be exhausted to create a force which propels said aquarium bottom cleaner laterally from a current cleaning position to a new cleaning position.

2. The aquarium bottom cleaner system of claim 1, wherein said controlling means comprises a preprogrammed schedule for turning on or off said suction means, whereby said suction means is terminated for a first predetermined duration so that said aquarium bottom cleaner system rises from said current cleaning position before turning on said suction means for a second predetermined duration so that said random position effecter causes said aquarium bottom cleaner system to move laterally in combination with lowering of said aquarium bottom cleaner system onto a new cleaning position on the bottom surface of the aquarium.

3. An aquarium bottom cleaner system for cleaning a bottom surface of an aquarium, wherein said aquarium bottom cleaner system comprises:
  a suction means comprising a naturally buoyant suction body having an open enlarged lower end, an open upper end and a propeller system, wherein said open enlarged lower end is adapted to be seated on the bottom surface of the aquarium and said open enlarged lower end is fluidly connected to said open upper end and said propeller system creates an untreated water flow from said open enlarged lower end to said open upper end;
  a powering means;
  a controlling means;
  an automatic positioning means; and
  a filtering means;
  wherein said suction means is powered by said powering means to move untreated water to be processed by said filtering means to produce a filtered return flow, and wherein said automatic positioning means cooperates with said controlling means to move said aquarium bottom cleaner system from a current cleaning position to a new cleaning position and said propeller system comprises a propeller having an axis of rotation, an eccentric shaft eccentrically disposed parallel to and at an offset with respect to said axis of rotation and said propeller is capable of creating rotary motion.

4. The aquarium bottom cleaner system of claim 3, wherein said propeller system is configured to provide net suction pressure of from 5 to 15 psi.

5. The aquarium bottom cleaner system of claim 3, wherein said filtering means comprises a dome shaped filter housing having an interior surface and a dome shaped filter having an opening, an impurities entrapment surface and a fluid return surface, wherein said untreated water flow is received at said opening and forced through said impurities entrapment surface of said filter, leaving behind impurities on said impurities entrapment surface and creating said filtered return flow in a cavity defined by said fluid return surface of said filter and said interior surface of said filter housing, and wherein said opening of said filter is fluidly coupled to said open upper end of said suction body.

6. The aquarium bottom cleaner system of claim 5, wherein said filter further comprises a lock disposed about said opening of said filter and configured to mate with said suction body such that said untreated water flow is received through said opening of said filter and said filter is readily removable from said suction body and cleansed using a water flow from said fluid return surface to said impurities entrapment surface to discard impurities from said impurities entrapment surface for reuse.

7. The aquarium bottom cleaner system of claim 5, wherein said filter further comprises a ledge disposed substantially on an inner periphery of said opening of said filter.

8. The aquarium bottom cleaner system of claim 5, wherein said filter comprises a micron rating of from about 25 to about 100 micron.

9. The aquarium bottom cleaner system of claim 3, further comprising an agitating means including an agitator configured to be coupled to said eccentric shaft of said propeller such that said agitator is powered by the rotary motion, said agitator comprises at least an elongated agitator member having a first end, a second end, an arm extending at a substantially right angle from said second end and an elongated slot, wherein said elongated slot is disposed between said first and second ends, said first end is pivotably connected to said eccentric shaft of said propeller, said elongated slot is slidingly and pivotably mounted to a pin fixedly attached to an attachment point in a plane substantially perpendicular to said axis of rotation on said suction body such that when said propeller rotates, said arm moves in a circular trajectory having a radius at a speed to cause agitation on the bottom surface of said aquarium.

10. The aquarium bottom cleaner system of claim 9, wherein said attachment point is configured to be fixable to any radial position from said axis of rotation within said plane such that said speed and radius of said circular trajectory are modifiable.

11. The aquarium bottom cleaner system of claim 3, wherein said powering means comprises a replenishable power supply and a docking means, wherein said replenishable power supply comprises a rechargeable battery and is rechargeable by a slave charging device configured to be powered by a master charging device when said slave charging device is docked by said docking means to said master charging device.

12. The aquarium bottom cleaner system of claim 11, wherein said docking means comprises a magnet configured to come within magnetic attraction of a docking base disposed in a vicinity of said master charging device such that said slave charging device receives power from said master charging device.

13. An aquarium bottom cleaner system for cleaning a substantially flat bottom surface of an aquarium in its entirety, comprising a controlling means, a naturally buoyant suction means and an automatic positioning means, wherein said controlling means controls turning on or off of said suction means, whereby when said naturally buoyant suction means is turned on according to a first task, said aquarium bottom cleaner system is laterally translated by said automatic positioning means and lowered to a portion of the bottom surface and when said naturally buoyant suction means is turned off according to a second task, said aquarium bottom cleaner system rises and said controlling means is configured to run a schedule comprising said first and second tasks such that the substantially flat bottom surface of said aquarium is cleaned in its entirety and said suction means comprises a naturally buoyant suction body having an open enlarged lower end, an open upper end and a propeller, wherein said lower end is adapted to be seated on the bottom surface of the aquarium and said open enlarged lower end is connected to said open upper end and said suction means creates a untreated water flow from said open enlarged lower end to said open upper end and said propeller comprises an axis of rotation and an eccentric shaft eccentrically disposed parallel to and at an offset with respect to said axis of rotation.

14. The aquarium bottom cleaner system of claim 13, further comprising an agitating means configured to be powered by said suction means.

15. The aquarium bottom cleaner system of claim 13, wherein said agitating means comprises an agitator configured to be coupled to said eccentric shaft of said propeller such that said agitator is powered by said propeller, wherein said agitator comprises at least an elongated agitator member having a first end, a second end, an arm extending at substantially right angle from said second end and an elongated slot, wherein said elongated slot is disposed between said first and second end, said first end is pivotably connected to said shaft of said propeller, said elongated slot is slidingly and pivotably mounted to a pin fixedly attached to an attachment point in a plane substantially perpendicular to said axis of rotation on said suction body such that when said propeller rotates, said arm moves to cause agitation on the bottom surface of the aquarium.

16. An aquarium bottom cleaner system for cleaning a bottom surface of an aquarium, wherein said aquarium bottom cleaner system disposed at a current cleaning position comprising:
- a suction means comprising a naturally buoyant suction body having an open enlarged lower end, an open upper end and a propeller system including a propeller having an axis of rotation, an eccentric shaft eccentrically disposed parallel to and at an offset with respect to said axis of rotation and said propeller is capable of creating rotary motion, wherein said lower end is adapted to be seated on the bottom surface of the aquarium and said open enlarged lower end is connected to said open upper end and said suction means creates a untreated water flow from said open enlarged lower end to said open upper end;
- a powering means comprising a replenishable power supply and a docking means, wherein said replenishable power supply comprises a rechargeable battery disposed within said suction body rechargeable by a slave charging device configured to be powered by a master charging device when said slave charging device is docked by said docking means to said master charging device and said docking means comprises a magnet configured to come within magnetic attraction of a docking base disposed in a vicinity of said master charging device such that said master charging device powers said slave charging device;
- a filtering means comprises a dome shaped filter housing having an interior surface and a dome shaped filter having an opening, an impurities entrapment surface and a fluid return surface, wherein said untreated water flow is received at said opening and forced through said impurities entrapment surface of said filter, leaving behind impurities on said impurities entrapment surface and creating a filtered return flow in a cavity defined by said fluid return surface of said filter and said interior surface of said filter housing and said opening of said filter is fluidly coupled to said upper end of said suction body;
- an automatic positioning means comprises a random position effecter comprising an annular cavity, a plurality of directional intake flow apertures, a plurality of plug balls and a plurality of substantially symmetrically disposed steer apertures along an outer radial periphery of said annular cavity, wherein a portion of said return flow is received through said plurality of directional intake flow apertures and directed into said annular cavity to form a flow which directs each said plug ball to plug a steer aperture, leaving at least one steer aperture unplugged such that said portion of said filtered return flow can be exhausted to create a force which propels said aquarium bottom cleaner from a current position to a new position; and
- a controlling means comprises a controller which utilizes a preprogrammed schedule for turning on or off said suction means, whereby when a new cleaning position is desired, said suction means is terminated for a first predetermined duration so that said naturally buoyant suction body causes said aquarium bottom cleaner to rise from said current cleaning position before turning on said suction means for a second predetermined duration so that said random position effecter causes said aquarium bottom cleaner to move laterally in combination with lowering said aquarium bottom cleaner system onto a new cleaning position on the bottom surface of the aquarium,
- wherein said suction means is powered by said powering means and said suction means moves untreated water to be processed by said filtering means to produce a return flow and said automatic positioning means cooperates with said controlling means to move said aquarium bottom cleaner system from a current cleaning position to a new cleaning position.

17. The aquarium bottom cleaner system of claim 16, further comprising an agitating means including an agitator configured to be coupled to said eccentric shaft of said propeller such that said agitator is powered by the rotary motion, said agitator comprises at least an elongated agitator member having a first end, a second end, an arm extending at substantially right angle from said second end and an elongated slot, wherein said elongated slot is disposed between said first and second end, said first end is pivotably connected to said shaft of said propeller, said elongated slot is slidingly and pivotably mounted to a pin fixedly attached to an attachment point in a plane substantially perpendicular to said axis of rotation on said suction body such that when said propeller rotates, said arm moves in a circular trajectory having a radius at a speed to cause agitation on the bottom surface of said aquarium and said attachment point is configured to be fixable to any radial position from said axis of rotation within said plane such that said speed and radius of said circular trajectory are modifiable.

* * * * *